No. 896,043. PATENTED AUG. 11, 1908.
M. V. PUTNAM.
SPOON.
APPLICATION FILED APR. 25, 1907.
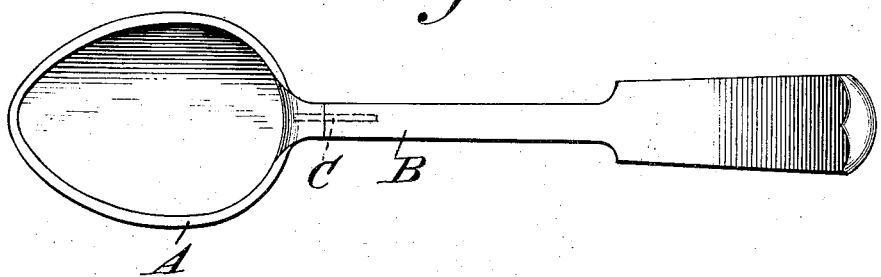
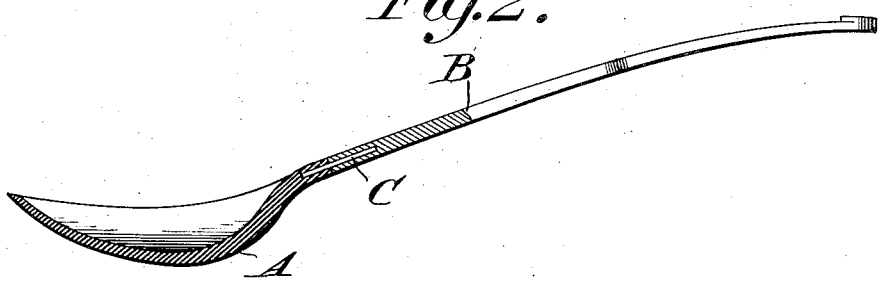

UNITED STATES PATENT OFFICE.

MARY V. PUTNAM, OF NEW ORLEANS, LOUISIANA.

SPOON.

No. 896,043.　　　Specification of Letters Patent.　　　Patented Aug. 11, 1908.

Application filed April 25, 1907. Serial No. 370,237.

*To all whom it may concern:*

Be it known that I, MARY V. PUTNAM, citizen of the United States, residing at New Orleans, in the parish of Orleans and State of Louisiana, have invented new and useful Improvements in Spoons, of which the following is a specification.

My invention pertains to spoons; and it contemplates the provision of a spoon designed more particularly for administering medicine to children and embodying a bowl of rubber or equivalent material that is non-absorbent and hence not liable to become impregnated with medicine, and that is, at the same time, soft and resilient so that in the event of a child biting the bowl, as frequently happens, the bowl will not be indented or otherwise impaired, and no injury will result to the child in way of cutting or hurting its gums or breaking its teeth. A spoon having a bowl of the character stated is also advantageous because medicine is not liable by chemical action to deteriorate the bowl, and the bowl is not subject to corrosion like a metallic bowl or calculated to break china or glass against which it strikes.

With the foregoing in mind, the invention will be fully understood from the following description and claims when the same are read in connection with the accompanying drawings, forming part of this specification, in which:

Figure 1 is a plan view of the spoon constituting the preferred embodiment of my invention. Fig. 2 is a view, partly in longitudinal vertical section and partly in side elevation, of the same.

Similar letters designate corresponding parts in both views of the drawings, referring to which:

A is the bowl of my novel spoon.

B is the spoon handle which is preferably, though not necessarily of suitable wood, and C is the dowel pin of wood, metal or other desired material, that is preferably employed to effect or assist in effecting connection of the bowl to the handle.

The bowl A is preferably of soft rubber, though it may, without involving departure from the scope of my invention, be formed of any material which like soft rubber is non-absorbent, and is soft and resilient. The non-absorbent quality of the bowl precludes its becoming impregnated with medicine, while its softness and resiliency obviates the liability of the gums or teeth of a child being injured in the event of the child biting the bowl as frequently happens. Moreover, it will be noted that a child is enabled to suck medicine in a natural manner from the rubber bowl as from a nipple, and that the rubber bowl is not subject to corrosion and is not liable to crack chinaware or glass against which it strikes. It will be noted at this point that the bowl A is provided with an integral shank for connection to the handle, and that in order to possess the practical advantages ascribed to it, it is absolutely necessary that the bowl A be formed entirely of a material that is at once non-absorbent, soft and resilient, and that the bowl be free of any other material to which end the integral shank contributes.

In addition to the advantages hereinbefore ascribed to my novel spoon, it will be appreciated that the spoon is simple and susceptible of being easily and cheaply produced; also, that because of its lack of value it is not liable to attract the cupidity of unscrupulous persons.

I am well aware of the dipper disclosed in the Letters-Patent granted to Thomas Smith, Jr., under date of Dec. 16, 1862, and numbered 37,181, and I make no claim to anything in common with the said dipper.

What I claim and desire to secure by Letters-Patent, is:

1. As an article of manufacture, a spoon comprising a bowl of soft, resilient and non-absorbent material having an integral shank, a handle, and a longitudinal connecting pin extending between the shank and handle and joining the two parts together.

2. As an article of manufacture, a spoon comprising a handle, and a bowl formed entirely of a material that is, at once, non-absorbent, soft, and resilient; the said bowl being joined at one end to the handle and being elsewhere entirely free.

In testimony whereof I have hereunto set my hand in presence of two subscribing witnesses.

MARY V. PUTNAM.

Witnesses:
　OSCAR L. PUTNAM,
　OSCAR P. GREEN.